United States Patent
Wang et al.

(10) Patent No.: US 10,151,615 B2
(45) Date of Patent: Dec. 11, 2018

(54) LIQUID LEVEL SENSOR, METHOD FOR CONTROLLING THE SAME AND REACTOR WITH THE SAME

(71) Applicant: Leica Microsystems Ltd., Shanghai, Shanghai (CN)

(72) Inventors: Wei Wang, Jiangsu (CN); Bin Liu, Shanghai (CN); Peng Chen, Shanghai (CN)

(73) Assignee: Leica Microsystems Ltd. Shanghai, Shanghai (CN)

( * ) Notice: Subject to any disclaimer, the term of this patent is extended or adjusted under 35 U.S.C. 154(b) by 0 days.

(21) Appl. No.: 15/450,540

(22) Filed: Mar. 6, 2017

(65) Prior Publication Data

US 2017/0268920 A1    Sep. 21, 2017

(30) Foreign Application Priority Data

Mar. 18, 2016 (CN) .......................... 2016 1 0156734

(51) Int. Cl.
 *G01N 1/00* (2006.01)
 *G01F 23/24* (2006.01)
 *B01J 19/24* (2006.01)

(52) U.S. Cl.
 CPC ............ *G01F 23/248* (2013.01); *B01J 19/24* (2013.01); *B01J 2219/00051* (2013.01); *B01J 2219/00182* (2013.01)

(58) Field of Classification Search
 CPC ...................................................... G01N 1/00
 See application file for complete search history.

(56) References Cited

U.S. PATENT DOCUMENTS

| 3,905,243 | A |  | 9/1975 | Goldfuss |  |
|---|---|---|---|---|---|
| 4,788,871 | A | * | 12/1988 | Nelson | ...................... A23L 3/00 374/143 |
| 2003/0046997 | A1 |  | 3/2003 | Waller |  |
| 2011/0087448 | A1 |  | 4/2011 | Haberkom |  |
| 2013/0295245 | A1 |  | 11/2013 | Gardner et al. |  |
| 2015/0323938 | A1 |  | 11/2015 | Levy et al. |  |

FOREIGN PATENT DOCUMENTS

| JP | 857175922 | 10/1982 |
|---|---|---|
| JP | 2014211345 | 11/2014 |

\* cited by examiner

*Primary Examiner* — Jyoti Nagpaul
(74) *Attorney, Agent, or Firm* — Hodgson Russ LLP

(57) ABSTRACT

A liquid level sensor, a method for controlling the same, and a reactor with the same are provided. The liquid level sensor includes a first mounting base and a cable assembly. The cable assembly includes a metal shell disposed on the first mounting base; a heating element for heating the metal shell; and a temperature detector for detecting a temperature of the metal shell.

18 Claims, 4 Drawing Sheets

LIQUID LEVEL SENSOR, METHOD FOR CONTROLLING THE SAME AND REACTOR WITH THE SAME

CROSS-REFERENCE TO RELATED APPLICATION

This application claims priority to and benefits of Chinese Patent Application Serial No. 201610156734.8, filed with the State Intellectual Property Office of P. R. China on Mar. 18, 2016, the entire content of which is incorporated herein by reference.

FIELD

The present invention relates to a liquid level sensor, and also relates to a method for controlling the same and a reactor with the same.

BACKGROUND

A reactor for tissue processing must be provided with a liquid level sensor to control the liquid level. However, a corrosive treating agent (such as xylene or liquid paraffin) may damage or pollute the existing liquid level sensor (like a photoelectric sensor) during processing.

SUMMARY

Embodiments of the present invention seek to solve at least one of the problems existing in the related art to at least some extent. Accordingly, the present invention provides a liquid level sensor having advantages of high corrosion resistance, a simple structure and low production cost.

The present invention further provides a method for controlling the liquid level sensor.

The present invention further provides a reactor with the liquid level sensor.

A liquid level sensor according to embodiments of a first aspect of the present invention includes a first mounting base and a cable assembly. The cable assembly includes a metal shell disposed on the first mounting base; a heating element for heating the metal shell; and a temperature detector for detecting a temperature of the metal shell.

The liquid level sensor according to the embodiments of the present invention has advantages of high corrosion resistance, simple structure and low production cost.

Moreover, the liquid level sensor according to the embodiments of the present invention may further have additional technical features as follows.

In an embodiment, the first mounting base defines a first accommodating chamber whose opposite first and second ends are open, in which a first end of the metal shell is accommodated in the first accommodating chamber or extended beyond the first accommodating chamber.

In an embodiment, the first mounting base includes: a mounting part having a cross section with a circular edge and formed with external threads at an outer peripheral face thereof; and a holding part connected with the mounting part and having a cross section with a polygonal edge.

In an embodiment, the edge of the holding part is located outside of the edge of the mounting part, and the liquid level sensor further includes a first seal ring fitted over the mounting part.

In an embodiment, the metal shell defines a second accommodating chamber therein, and the heating element and the temperature detector are disposed in the second accommodating chamber.

In an embodiment, a first surface of the heating element is in contact with a first wall surface of the second accommodating chamber, a shape of the first surface being matched with that of the first wall surface.

In an embodiment, the liquid level sensor further includes a second seal ring fitted over the metal shell and clamped between the metal shell and the first mounting base.

In an embodiment, the metal shell is provided with a step part thereon and the second seal ring abuts against the step part.

In an embodiment, the heating element is adjacent to the first end of the metal shell, and the temperature detector is adjacent to the first end of the metal shell.

A method for controlling a liquid level sensor according to embodiments of a second aspect of the present invention includes: heating the metal shell to a predetermined temperature by a heating element and maintaining the metal shell at the predetermined temperature; and detecting the temperature of the metal shell by the temperature detector and calculating a decrease value of a temperature reading of the temperature detector during a predetermined time period, determining that the liquid level reaches a position of the liquid level sensor if the decrease value is greater than or equal to a predetermined value, otherwise, determining that the liquid level does not reach the position of the liquid level sensor.

With the method according to the embodiments of the present invention, it is possible to determine whether the liquid level reaches the position of the liquid level sensor accurately.

In an embodiment, the predetermined temperature is in a range from 110° C. to 120° C. when the liquid is xylene or liquid paraffin; the predetermined temperature is in a range from 90° C. to 100° C. when the liquid is another treating agent except xylene or liquid paraffin.

In an embodiment, the predetermined temperature is 115° C. when the liquid is xylene or liquid paraffin; the predetermined temperature is 95° C. when the liquid is another treating agent except xylene or liquid paraffin.

In an embodiment, the heating element is controlled by PID. When the liquid is xylene or liquid paraffin, parameters P=110, I=120, D=1212 if the temperature reading of the temperature detector is smaller than or equal to 110° C., otherwise, parameters P=200, I=1000, D=0; when the liquid is another treating agent except xylene or liquid paraffin, parameters P=120, I=1212, D=80 if the temperature reading of the temperature detector is smaller than or equal to 90° C., otherwise, parameters P=200, I=1000, D=0.

In an embodiment, when the liquid is xylene or liquid paraffin, if the decrease value of the temperature reading of the temperature detector during 5 seconds is greater than or equal to 6° C., it is determined that the liquid level reaches the position of the liquid level sensor, otherwise, it is determined that the liquid level does not reach the position of the liquid level sensor; when the liquid is another treating agent except xylene or liquid paraffin, if the decrease value of the temperature reading of the temperature detector during 5 seconds is greater than or equal to 10° C., it is determined that the liquid level reaches the position of the liquid level sensor, otherwise, it is determined that the liquid level does not reach the position of the liquid level sensor.

A reactor according to embodiments of a third aspect of the present invention includes: a body defining a cavity therein; and a liquid level sensor according to the first aspect of the present invention, the liquid level sensor being disposed on a wall of the cavity.

According to an embodiment of the present invention, a through-hole is formed in a side wall of the cavity; the reactor further includes a second mounting base disposed at an outer side of the body and defining a mounting chamber communicated with the cavity via the through-hole, in which the first mounting base is disposed on the second mounting base, and the first end of the metal shell is accommodated in one of the first accommodating chamber, the mounting chamber and the cavity.

In an embodiment, a portion of the first mounting base is threadedly fitted with the wall surface of the mounting chamber, and the first end of the metal shell is extended into the cavity via the through-hole.

In an embodiment, a seal ring is disposed between the first mounting base and the second mounting base.

Figure 1:
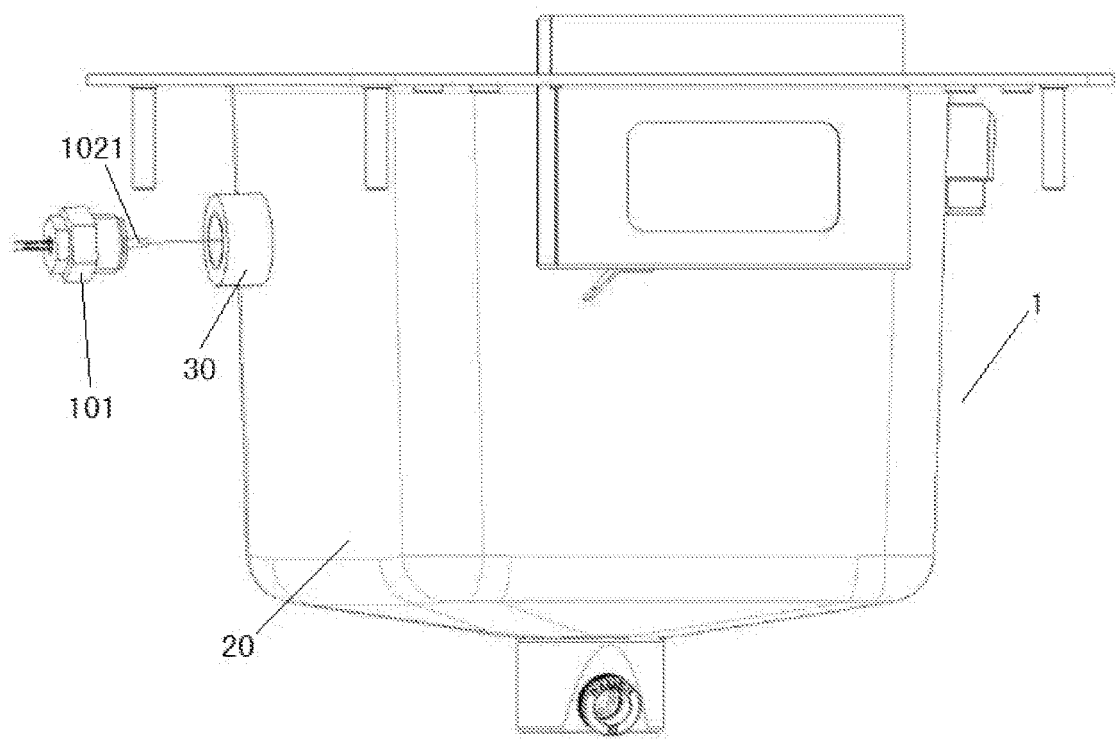
FIG. 1 is an exploded view of a reactor according to an embodiment of the present invention.

REFERENCE NUMERALS 1 reactor
10 liquid level sensor
101 first mounting base
1011 mounting part
1012 holding part
102 cable assembly
1021 metal shell
10211 second accommodating chamber
10212 first end
1022 heating element
1023 temperature detector
103 first seal ring
104 second seal ring
20 body
30 second mounting base

DETAILED DESCRIPTION

Embodiments of the present invention will be described in detail and examples of the embodiments will be illustrated in the drawings. The embodiments described herein with reference to drawings are explanatory, which are used to illustrate the present invention, but shall not be construed to limit the present invention.

A reactor 1 according to embodiments of the present invention will be described with reference to the drawings. As shown in FIGS. 1 to 4, the reactor 1 according to embodiments of the present invention includes a liquid level sensor 10 and a body 20. The body 20 defines a cavity therein.

The liquid level sensor 10 includes a first mounting base 101 and a cable assembly 102. The cable assembly 102 includes a metal shell 1021, a heating element 1022 for heating the metal shell 1021, and a temperature detector 1023 for detecting a temperature of the metal shell 1021. The metal shell 1021 is disposed on the first mounting base 101.

The liquid level sensor 10 is disposed on a wall of the cavity to facilitate the contact between a first end 10212 of the metal shell 1021 and the liquid in the cavity.

A method for controlling the liquid level sensor 10 according to embodiments of the present invention will be described in the following. That is, the liquid level sensor 10 according to embodiments of the present invention is employed to determine whether the liquid level in the cavity of the reactor 1 reaches a predetermined position.

The method for controlling the liquid level sensor 10 according to embodiments of the present invention includes the following steps: heating the metal shell 1021 to a predetermined temperature by the heating element 1022 and maintaining the metal shell 1021 at the predetermined temperature; and detecting the temperature of the metal shell 1021 by the temperature detector 1023 and calculating a decrease value of a temperature reading of the temperature detector 1023 during a predetermined time period, determining that the liquid level reaches a position of the liquid level sensor 10 (i.e. the predetermined position) if the decrease value is greater than or equal to a predetermined value, otherwise, determining that the liquid level does not reach the position of the liquid level sensor 10.

Specifically, the heating element 1022 may be used to heat the metal shell 1021 to a relatively high temperature. If the liquid in the cavity of the reactor 1 reaches the predetermined position, the liquid in the cavity is in contact with the first end 10212 of the metal shell 1021. Since the temperature of the liquid in the cavity is low, the liquid may cool the first end 10212 of the metal shell 1021 after they are in contact with each other, such that the temperature of the first end 10212 of the metal shell 1021 is decreased to a certain extent during a predetermined time period. Consequently, if the decrease value of the temperature reading of the temperature detector 1023 is greater than or equal to a predetermined value, it is determined that the liquid level reaches the position of the liquid level sensor 10; otherwise, it is determined that the liquid level does not reach the position of the liquid level sensor 10.

The liquid level sensor 10 according to embodiments of the present invention is provided with the heating element 1022 for heating the metal shell 1021, and the temperature detector 1023 for detecting the temperature of the metal shell 1021, so as to determine whether the liquid in the reactor 1 reaches the predetermined position according to the temperature change of the metal shell 1021 (i.e. the decrease value of the temperature reading of the temperature detector 1023) during the predetermined time period. Thus, the liquid level sensor 10 according to embodiments of the present invention has a different working principle from the existing liquid level sensor (e.g. a photoelectric sensor).

The liquid level sensor 10 according to embodiments of the present invention determines whether the liquid in the reactor 1 reaches the predetermined position according to the temperature change during the predetermined time period, so the liquid level sensor 10 according to embodiments of the present invention may utilize the metal shell 1021 as a component to contact with the liquid in the reactor 1. In such a way, the corrosion-resistant performance of the liquid level sensor 10 may be improved considerably.

Furthermore, the liquid level sensor 10 according to embodiments of the present invention mainly includes the metal shell 1021, the heating element 1022 and the temperature detector 1023. These components have simple structures and low production costs. Accordingly, the liquid level sensor 10 according to embodiments of the present invention also has advantages of simple structure and low production cost.

Therefore, the liquid level sensor 10 according to embodiments of the present invention has advantages of high corrosion resistance, simple structure and low production cost.

With the method for controlling the liquid level sensor 10 according to embodiments of the present invention, it is possible to determine whether the liquid level reaches the position of the liquid level sensor 10 accurately.

As shown in FIGS. 1 to 4, the reactor 1 according to embodiments of the present invention includes the body 20 and the liquid level sensor 10.

The body 20 defines a cavity therein, and a through-hole is formed in a side wall of the cavity. The reactor 1 further includes a second mounting base 30 disposed at an outer side of the body 20 and defining a mounting chamber communicated with the cavity via the through-hole.

The liquid level sensor 10 includes the first mounting base 101, the metal shell 1021, the heating element 1022 and the temperature detector 1023. The first mounting base 101 is disposed on the second mounting base 30. That is, it is more convenient and easier to mount the liquid level sensor 10 on the body 20 by providing the second mounting base 30.

Specifically, the first mounting base 101 may be in threaded connection with the second mounting base 30. For example, the first mounting base 101 is formed with external threads on its outer peripheral face while the second mounting base 30 is formed with internal threads on a wall surface of its mounting chamber. Part of threads of the first mounting base 101 is threadedly fitted in the mounting chamber of the second mounting base 30.

Figure 2:
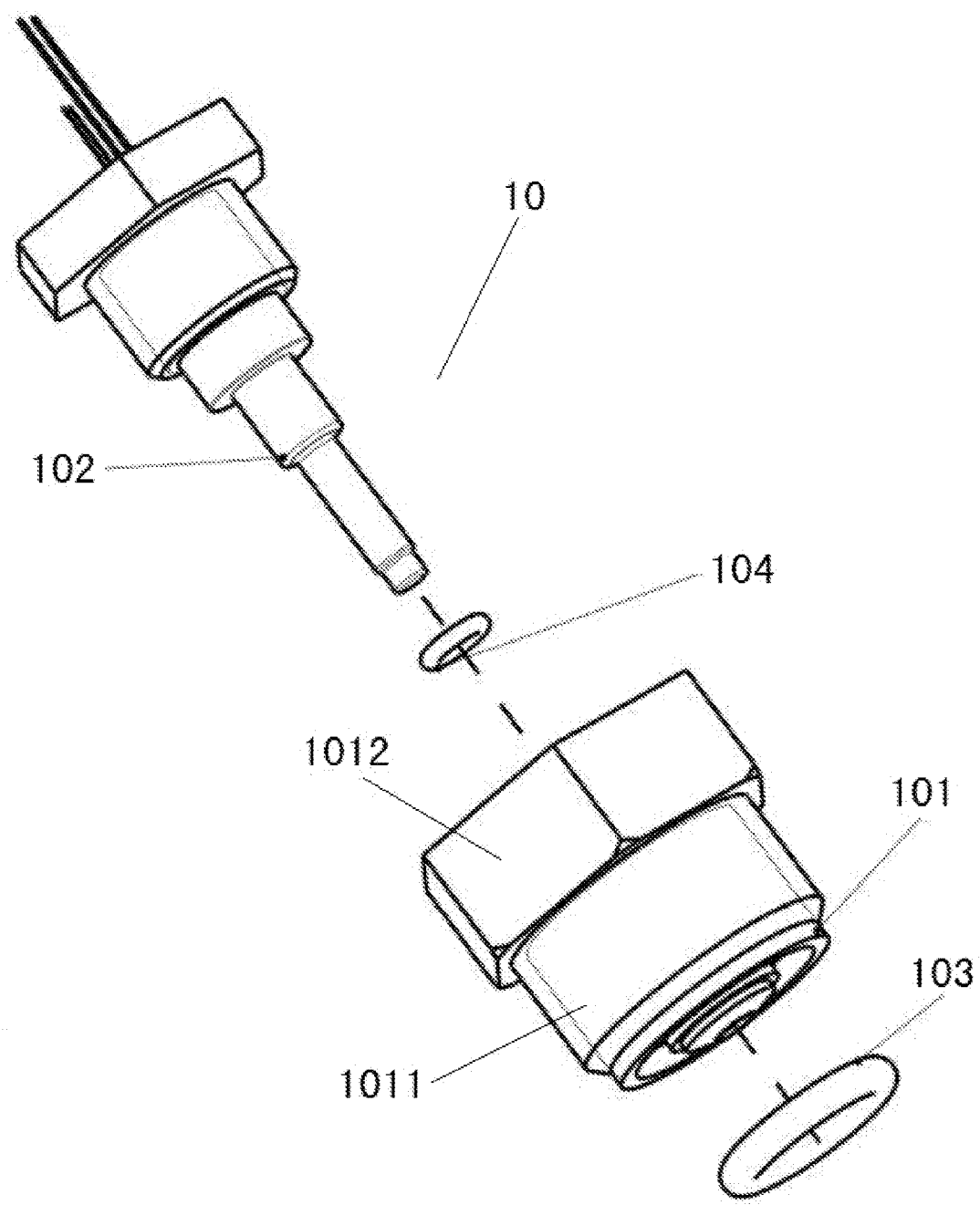
FIG. 2 is an exploded view of a liquid level sensor according to an embodiment of the present invention.

As shown in FIGS. 1 and 2, in an embodiment of the present invention, the first mounting base 101 includes a mounting part 1011 and a holding part 1022. The cross section of the mounting part 1011 has a circular edge and the mounting part 1011 is formed with external threads at an outer peripheral face thereof, in which the mounting part 1011 is threadedly fitted in the mounting chamber of the second mounting base 30. The holding part 1012 is connected with the mounting part 1011 and the cross section of the holding part 1012 has a polygonal edge.

Since the cross section of the holding part 1012 has the polygonal edge, it is possible to mount the first mounting base 101 on the second mounting base 30 more conveniently. Advantageously, the mounting part 1011 and the holding part 1012 may be formed integrally.

As shown in FIG. 2, a first seal ring 103 is disposed between the first mounting base 101 and the second mounting base 30, so as to improve the sealing performance of the reactor 1 and to prevent the liquid in the reactor 1 from flowing out through a gap between the first mounting base 101 and the second mounting base 30.

Specifically, the edge of the holding part 1012 is located outside of the edge of the mounting part 1011, so the first mounting base 101 may be provided with a step part. The first seal ring 103 is fitted over the mounting part 1011 and clamped between the holding part 1012 and the second mounting base 30.

More specifically, a first end face of the holding part 1012 is opposite to the second mounting base 30; a first end face of the second mounting base 30 is opposite to the holding part 1012; the first seal ring 103 is clamped between the first end face of the holding part 1012 and the first end face of the second mounting base 30.

In an example of the present invention, the first mounting base 101 defines a first accommodating chamber whose opposite first and second ends are open. The first end 10212 of the metal shell 1021 is accommodated in one of the first accommodating chamber, the mounting chamber and the cavity.

Specifically, the mounting chamber is in communication with the cavity and the mounting chamber is in communication with the first accommodating chamber, or the first accommodating chamber may be in direct communication with the cavity, so the first end 10212 of the metal shell 1021 may contact with the liquid in the cavity.

Advantageously, the first end 10212 of the metal shell 1021 passes through the first accommodating chamber, the mounting chamber and the through-hole and extends into the cavity, such that the first end 10212 of the metal shell 1021 may be in contact with more liquid in the cavity more easily and timely, so as to improve the sensitivity of the liquid level sensor 10.

The metal shell 1021 may be made of a metal material of high corrosion resistance, for example, stainless steel. A part of the metal shell 1021 may be accommodated in the first accommodating chamber of the first mounting base 101.

Advantageously, as shown in FIG. 2, the liquid level sensor 10 further includes a second seal ring 104 fitted over the metal shell 1021 and clamped between the metal shell 1021 and the first mounting base 101, so as to improve the sealing performance of the reactor 1 and to prevent the liquid in the reactor 1 from flowing out through a gap between the first mounting base 101 and the metal shell 1021.

Specifically, the metal shell 1021 is provided with a step part thereon, and the second seal ring 104 abuts against the step part.

Figure 3:
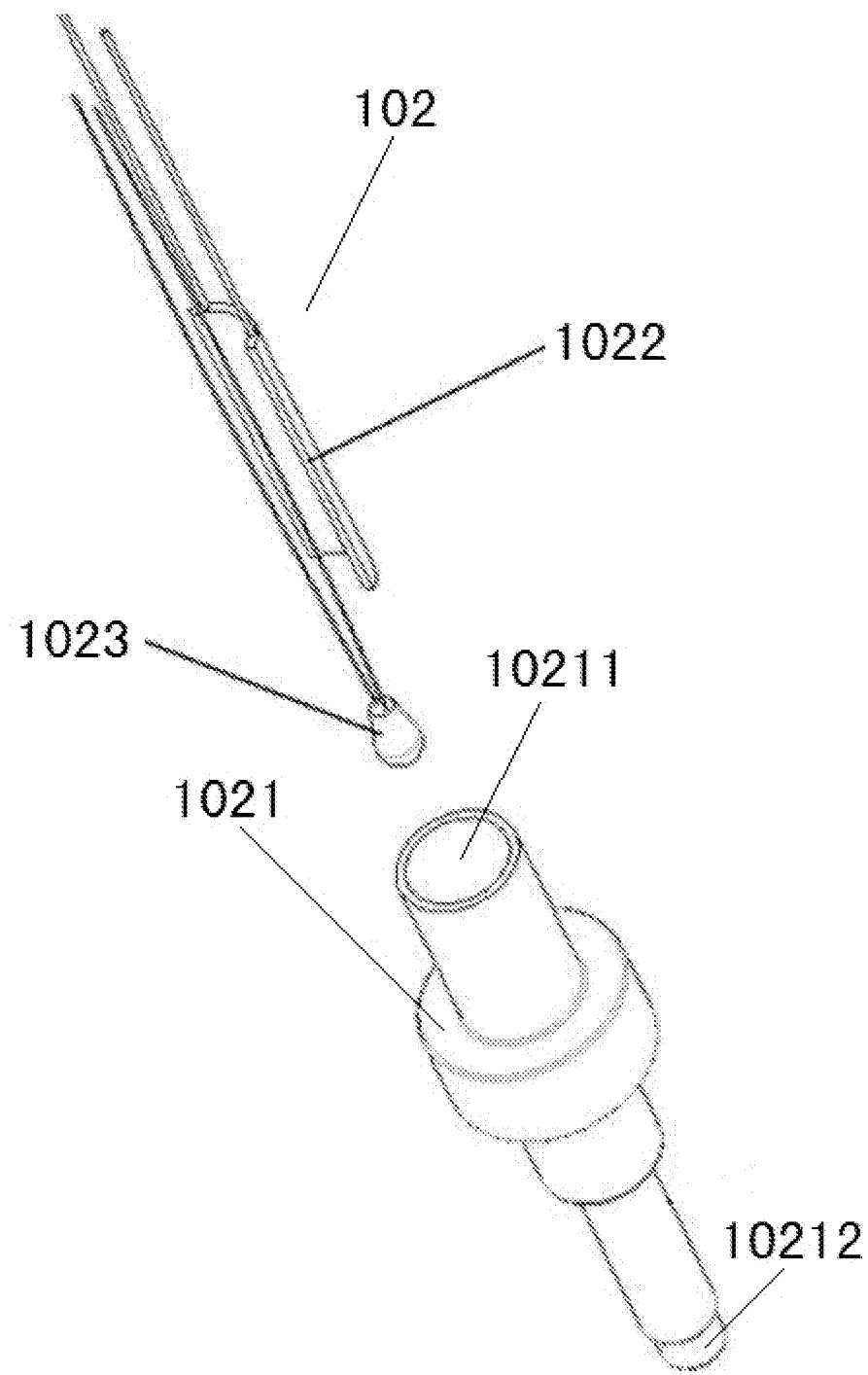
FIG. 3 is an exploded view of a cable assembly of a liquid level sensor according to an embodiment of the present invention.
Figure 4:
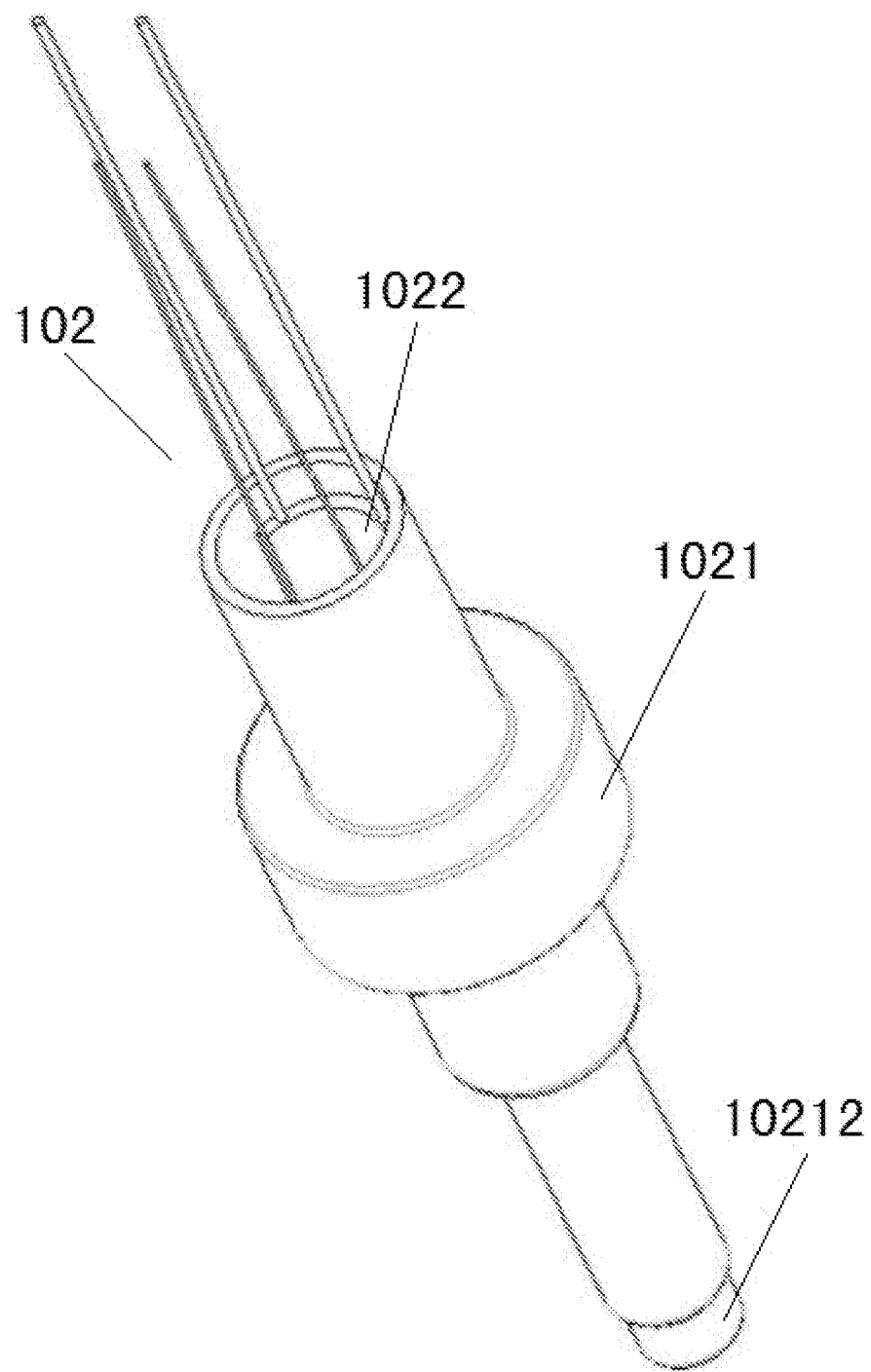
FIG. 4 is a schematic view of a cable assembly of a liquid level sensor according to an embodiment of the present invention.

As shown in FIGS. 3 and 4, in some examples of the present invention, the metal shell 1021 defines a second accommodating chamber 10211 therein, and the heating element 1022 and the temperature detector 1023 are disposed within the second accommodating chamber 10211 respectively.

In a specific example of the present invention, a first surface of the heating element 1022 is in contact with a first wall surface of the second accommodating chamber 10211, and the shape of the first surface is matched with that of the first wall surface. In such a way, the whole first surface of the heating element 1022 contacts with the first wall of the second accommodating chamber 10211, so as to heat the metal shell 1021 more effectively and rapidly.

Advantageously, the temperature detector 1023 is adjacent to the first end 10212 of the metal shell 1021. The first end 10212 of the metal shell 1021 contacts with the liquid in the reactor 1 in use, so the temperature detector 1023 may detect the temperature of the first end 10212 of the metal shell 1021 more accurately and rapidly by the fact that the temperature detector 1023 is adjacent to the first end 10212 of the metal shell 1021, so as to improve the sensitivity of the liquid level sensor 10.

More advantageously, the heating element 1022 is adjacent to the first end 10212 of the metal shell 1021, so as to heat the first end 10212 of the metal shell 1021 more effectively.

The liquid level sensor 10 according to embodiments of the present invention is controlled in different ways regarding specific using situations and conditions.

Specifically, the predetermined temperature is in a range from 110° C. to 120° C., preferably 115° C., when the liquid in the reactor 1 is xylene or liquid paraffin. That is, when the liquid in the reactor 1 is xylene or liquid paraffin, the metal shell 1021 is heated to and maintained at a range from 110° C. to 120° C., preferably 115° C.

The predetermined temperature is in a range from 90° C. to 100° C., preferably 95° C., when the liquid in the reactor 1 is another treating agent except xylene or liquid paraffin. That is, when the liquid in the reactor 1 is another treating agent except xylene or liquid paraffin, the metal shell 1021 is heated to and maintained at a range from 90° C. to 100° C., preferably 95° C.

In order to heat the metal shell 1021 fast and maintain the temperature of the metal shell 1021, a combination of high-speed PID and low-speed PID may be used to control the heating element 1022.

Specifically, when the liquid is xylene or liquid paraffin, parameters P=110, I=120, D=1212 if the temperature reading of the temperature detector 1023 is smaller than or equal to 110° C.; parameters P=200, I=1000, D=0 if the temperature reading of the temperature detector 1023 is greater than 110° C.

When the liquid is another treating agent except xylene or liquid paraffin, parameters P=120, I=1212, D=80 if the temperature reading of the temperature detector 1023 is smaller than or equal to 90° C.; parameters P=200, I=1000, D=0 if the temperature reading of the temperature detector 1023 is greater than 90° C.

The liquid level in the reactor 1 may rise constantly after the reactor 1 is supplied with the liquid. When the liquid level reaches the position of the liquid level sensor 10, the liquid contacts with and cools the metal shell 1021, so as to lower the temperature of the metal shell 1021 quickly. Hence, it may be determined that the liquid level reaches the position of the liquid level sensor 10 if the temperature of the metal shell 1021 is lowered by a predetermined value during a predetermined time period, i.e. the temperature reading of the temperature detector 1023 is decreased by the predetermined value during the predetermined time period.

In a specific example of the present invention, when the liquid is xylene or liquid paraffin, if the decrease value of the temperature reading of the temperature detector 1023 during 5 seconds is greater than or equal to 6° C., it is determined that the liquid level reaches the position of the liquid level sensor 10, otherwise, it is determined that the liquid level does not reach the position of the liquid level sensor 10.

In other words, if the decrease value of the temperature reading of the temperature detector 1023 during no more than 5 seconds is no less than 6° C., it is determined that the liquid level reaches the position of the liquid level sensor 10, otherwise, it is determined that the liquid level does not reach the position of the liquid level sensor 10. For example, when the temperature reading of the temperature detector 1023 during 4 seconds is decreased by 6° C., or when the temperature reading of the temperature detector 1023 during 5 seconds is decreased by 8° C., or when the temperature reading of the temperature detector 1023 during 5 seconds is decreased by 6° C., it may be determined that the liquid level reaches the position of the liquid level sensor 10.

When the liquid is another treating agent except xylene or liquid paraffin, if the decrease value of the temperature reading of the temperature detector 1023 during 5 seconds is greater than or equal to 10° C., it is determined that the liquid level reaches the position of the liquid level sensor 10, otherwise, it is determined that the liquid level does not reach the position of the liquid level sensor 10.

In other words, if the decrease value of the temperature reading of the temperature detector 1023 during no more than 5 seconds is no less than 10° C., it is determined that the liquid level reaches the position of the liquid level sensor 10, otherwise, it is determined that the liquid level does not reach the position of the liquid level sensor 10. For example, when the temperature reading of the temperature detector 1023 during 4 seconds is decreased by 10° C., or when the temperature reading of the temperature detector 1023 during 5 seconds is decreased by 12° C., or when the temperature reading of the temperature detector 1023 during 5 seconds is decreased by 10° C., it may be determined that the liquid level reaches the position of the liquid level sensor 10.

In the description of the present invention, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation or position as shown in the drawings under discussion. These relative terms are for convenience of description and do not indicate or imply that the apparatus or members must have a particular orientation or be constructed and operated in a particular orientation. Therefore, these terms shall not be construed to limit the present invention.

In addition, terms such as "first" and "second" are used herein for purposes of description and are not intended to indicate or imply relative importance or significance or to imply the number of indicated technical features. Thus, the feature defined with "first" and "second" may explicitly or implicitly include one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interaction of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above" or "on top of" a second feature may include an embodiment in which the first feature is right or obliquely "on," "above" or "on top of" the second feature, or just means that the first feature is at a height higher than that of the second feature; while a first feature "below," "under" or "on bottom of" a second feature may include an embodiment in which the first feature is right or obliquely "below," "under" or "on bottom of" the second feature, or just means that the first feature is at a height lower than that of the second feature.

Reference throughout this specification to "an embodiment," "some embodiments," "examples," "specific examples," or "some examples" means that a particular feature, structure, material, or characteristic described in connection with the embodiment or example is included in at least one embodiment or example of the present invention. Thus, these terms throughout this specification do not necessarily refer to the same embodiment or example of the present invention. Furthermore, the particular features, structures, materials, or characteristics may be combined in any suitable manner in one or more embodiments or examples. In addition, those skilled in the art can combine different embodiments or examples described in the specification.

Although embodiments of the present invention have been shown and described, it would be appreciated by those skilled in the art that the above embodiments cannot be construed to limit the present invention, and changes, modifications, alternatives and variations can be made in the embodiments without departing from the scope of the present invention.

What is claimed is:

1. A liquid level sensor, comprising:
   a first mounting base; and
   a cable assembly, comprising:
      a metal shell disposed on the first mounting base;
      a heating element for heating the metal shell; and
      a temperature detector for detecting a temperature of the metal shell.

2. The liquid level sensor according to claim 1, wherein the first mounting base defines a first accommodating chamber whose opposite first and second ends are open, wherein a first end of the metal shell is accommodated in the first accommodating chamber or extended beyond the first accommodating chamber.

3. The liquid level sensor according to claim 2, wherein the heating element is adjacent to the first end of the metal shell, and the temperature detector is adjacent to the first end of the metal shell.

4. The liquid level sensor according to claim 1, wherein the first mounting base comprises:
   a mounting part having a cross section with a circular edge and formed with external threads at an outer peripheral face thereof; and
   a holding part connected with the mounting part and having a cross section with a polygonal edge.

5. The liquid level sensor according to claim 4, wherein the edge of the holding part is located outside of the edge of the mounting part, and the liquid level sensor further comprises a first seal ring fitted over the mounting part.

6. The liquid level sensor according to claim 1, wherein the metal shell defines a second accommodating chamber therein, and the heating element and the temperature detector are disposed in the second accommodating chamber.

7. The liquid level sensor according to claim 6, wherein a first surface of the heating element is in contact with a first wall surface of the second accommodating chamber, a shape of the first surface being matched with that of the first wall surface.

8. The liquid level sensor according to claim 1, further comprising a second seal ring fitted over the metal shell and clamped between the metal shell and the first mounting base.

9. The liquid level sensor according to claim 8, wherein the metal shell is provided with a step part thereon and the second seal ring abuts against the step part.

10. A method for controlling a liquid level sensor, wherein the liquid level sensor comprises:
    a first mounting base; and
    a cable assembly, comprising:
       a metal shell disposed on the first mounting base;
       a heating element for heating the metal shell; and
       a temperature detector for detecting a temperature of the metal shell, wherein the method comprises:
    heating the metal shell to a predetermined temperature by a heating element and maintaining the metal shell at the predetermined temperature; and
    detecting the temperature of the metal shell by the temperature detector and calculating a decrease value of a temperature reading of the temperature detector during a predetermined time period, determining that the liquid level reaches a position of the liquid level sensor if the decrease value is greater than or equal to a predetermined value, otherwise, determining that the liquid level does not reach the position of the liquid level sensor.

11. The method according to claim 10, wherein the predetermined temperature is in a range from 110° C. to 120° C. when the liquid is xylene or liquid paraffin; the predetermined temperature is in a range from 90° C. to 100° C. when the liquid is another treating agent except xylene or liquid paraffin.

12. The method according to claim 11, wherein the predetermined temperature is 115° C. when the liquid is xylene or liquid paraffin; the predetermined temperature is 95° C. when the liquid is another treating agent except xylene or liquid paraffin.

13. The method according to claim 11, wherein the heating element is controlled by PID;
    when the liquid is xylene or liquid paraffin, parameters P=110, I=120, D=1212 if the temperature reading of the temperature detector is smaller than or equal to 110° C., otherwise, parameters P=200, I=1000, D=0;
    when the liquid is another treating agent except xylene or liquid paraffin, parameters P=120, I=1212, D=80 if the temperature reading of the temperature detector is smaller than or equal to 90° C., otherwise, parameters P=200, I=1000, D=0.

14. The method according to claim 11, wherein
    when the liquid is xylene or liquid paraffin, if the decrease value of the temperature reading of the temperature detector during 5 seconds is greater than or equal to 6° C., it is determined that the liquid level reaches the position of the liquid level sensor, otherwise, it is determined that the liquid level does not reach the position of the liquid level sensor;
    when the liquid is another treating agent except xylene or liquid paraffin, if the decrease value of the temperature reading of the temperature detector during 5 seconds is greater than or equal to 10° C., it is determined that the liquid level reaches the position of the liquid level sensor, otherwise, it is determined that the liquid level does not reach the position of the liquid level sensor.

15. A reactor, comprising:
    a body defining a cavity therein; and
    a liquid level sensor disposed on a wall of the cavity, wherein the liquid level sensor comprises:
    a first mounting base; and
    a cable assembly, comprising:
       a metal shell disposed on the first mounting base;
       a heating element for heating the metal shell; and
       a temperature detector for detecting a temperature of the metal shell.

16. The reactor according to claim 15, wherein a through-hole is formed in a side wall of the cavity; the reactor further comprises a second mounting base disposed at an outer side of the body and defining a mounting chamber communicated with the cavity via the through-hole, wherein the first mounting base is disposed on the second mounting base, and the first end of the metal shell is accommodated in one of the first accommodating chamber, the mounting chamber and the cavity.

17. The reactor according to claim 16, wherein a portion of the first mounting base is threadedly fitted with the wall surface of the mounting chamber, and the first end of the metal shell is extended into the cavity via the through-hole.

18. The reactor according to claim 16, wherein a seal ring is disposed between the first mounting base and the second mounting base.

* * * * *